Jan. 20, 1959 B. J. NORRIS 2,870,259

SYNCHRONOUS CLAMPING

Filed Oct. 21, 1955 2 Sheets-Sheet 1

INVENTOR.
BEVITT J. NORRIS

BY George A. Gust

ATTORNEY

SYNCHRONOUS CLAMPING

Filed Oct. 21, 1955 2 Sheets-Sheet 2

INVENTOR.
BEVITT J. NORRIS

BY George A. Gust
ATTORNEY

United States Patent Office 2,870,259

Patented Jan. 20, 1959

2,870,259

SYNCHRONOUS CLAMPING

Bevitt J. Norris, Fort Wayne, Ind., assignor to International Telephone and Telegraph Corporation Application October 21, 1955, Serial No. 541,994

7 Claims. (Cl. 179—15)

This invention relates to synchronous switching and is particularly directed to means for amplifying a plurality of multiplexed signals in a single amplifier circuit.

It is old to successively sample the signals from a plurality of signal sources by means of a high speed commutator switch, to transmit the signal over a common circuit and to separate the signals at the receiving end by a second switch carefully synchronized with the first. It is not old, however, to amplify the plurality of signals in a common high gain amplifier, particularly where the range of amplitudes of the several signals may be wide. Cross-talk invariably results where a strong signal voltage is sampled and is followed by a weak signal in the next adjacent time channel. Apparently cross-talk is caused by residual charges stored in the capacities of the amplifier circuit. At the higher speeds these capacities do not have time to completely discharge, or to return to a reference voltage, before the next succeeding signal is sampled and applied.

The object of this invention is to synchronously clamp all alternating current coupling points of the common amplifier of a multiplex system to a reference voltage point.

The object of this invention is realized by a common amplifier, the input circuits of which are synchronously switched to a plurality of signal sources and the output circuits of which are synchronously switched to a plurality of signal utilization circuits. The amplifier is of the alternating current coupled type with means for reestablishing the quiescent charge on the coupling capacitors after each signal source has been sampled and transmitted. A low source impedance is employed to charge the capacitors, such as a cathode follower.

The above-mentioned and other features and objects of this invention and the manner of attaining them will become more apparent and the invention itself will be best understood by reference to the following description of an embodiment of the invention taken in conjunction with the accompanying drawings wherein.

Figure 1:
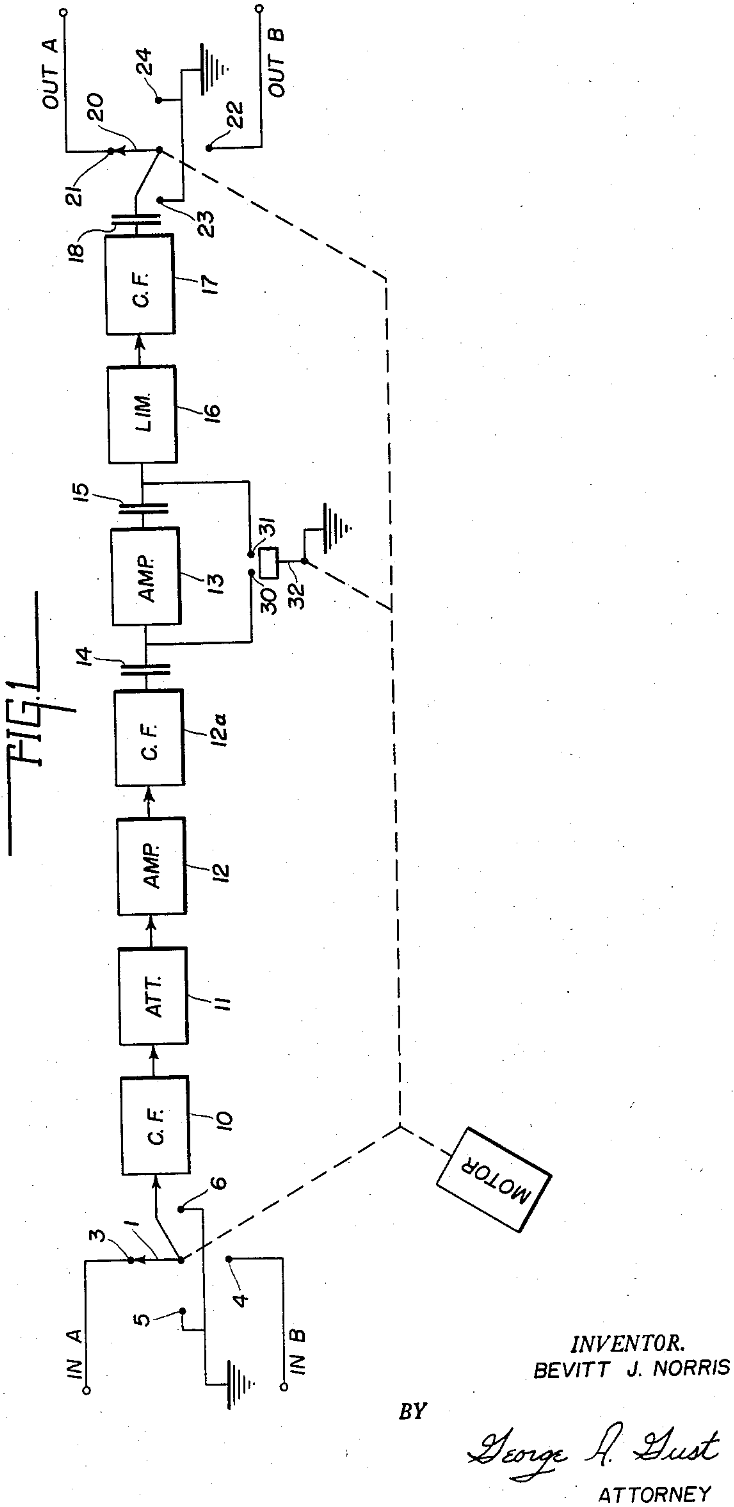
Fig. 1 is a block diagram of one system embodying this invention.

It is sufficient to describe this invention by considering two signal sources, A and B, although additional signal sources are within the capabilities of this system. The signals at inputs A and B are successively sampled and are relayed to outputs A and B, respectively. The rotary element 1 of a switch driven by a motor through shaft 2 alternately makes contact with circuits 3 and 4. There are commercially available switches driven at high speeds which can make contact with several hundred contact elements per minute. In the switch contemplated here live segments 3 and 4 are alternated with fixed-potential segments 5 and 6 so that the wiper 1 of the switch is returned to a reference potential, such as ground, after each signal is sampled. The wiper is coupled to a cathode follower amplifier 10 through an adjustable attenuator 11, through amplifier 12, through a second cathode follower 12*a* to amplifier 13. Amplifier 13, of any desired gain, is coupled through coupling condensers 14 and 15 at its input and output, respectively, to the cathode follower 12*a* and to the limiter amplifier 16. The output of limiter 16 is applied through cathode follower 17 to the coupling condenser 18 and hence to the wiper 20 of the second rotary switch. Wiper 20 is driven in synchronism with wiper 1 so that the multiplexed signals A and B are unscrambled and applied to their proper output circuits A and B. Signal segments 21 and 22 of the switch alternate with grounded segments 23 and 24 for reducing cross-talk between the output channels due to residual storage of the signal in coupling condenser 18.

According to an important feature of this invention, coupling condensers 14 and 15, which are the only coupling condensers of the high gain amplifier portion of the system, are synchronously clamped to ground. One side of each coupling condenser 14 and 15 is connected to contacts 30 and 31 which are connected to ground through wiper 32 after each signal is sampled and transmitted. In the system shown in Fig. 1 condensers 14 and 15 are grounded each time the input and output circuits 1 and 20 are grounded. Conveniently, wiper 32 may be mounted on a shaft common to the wipers 1 and 20. By grounding the alternating current coupling points of the common amplifier according to this invention, the amplifier is found to be capable of relaying signals with negligible cross-talk, even though there may be gain variations as high as 100 to 1.

Figure 2:
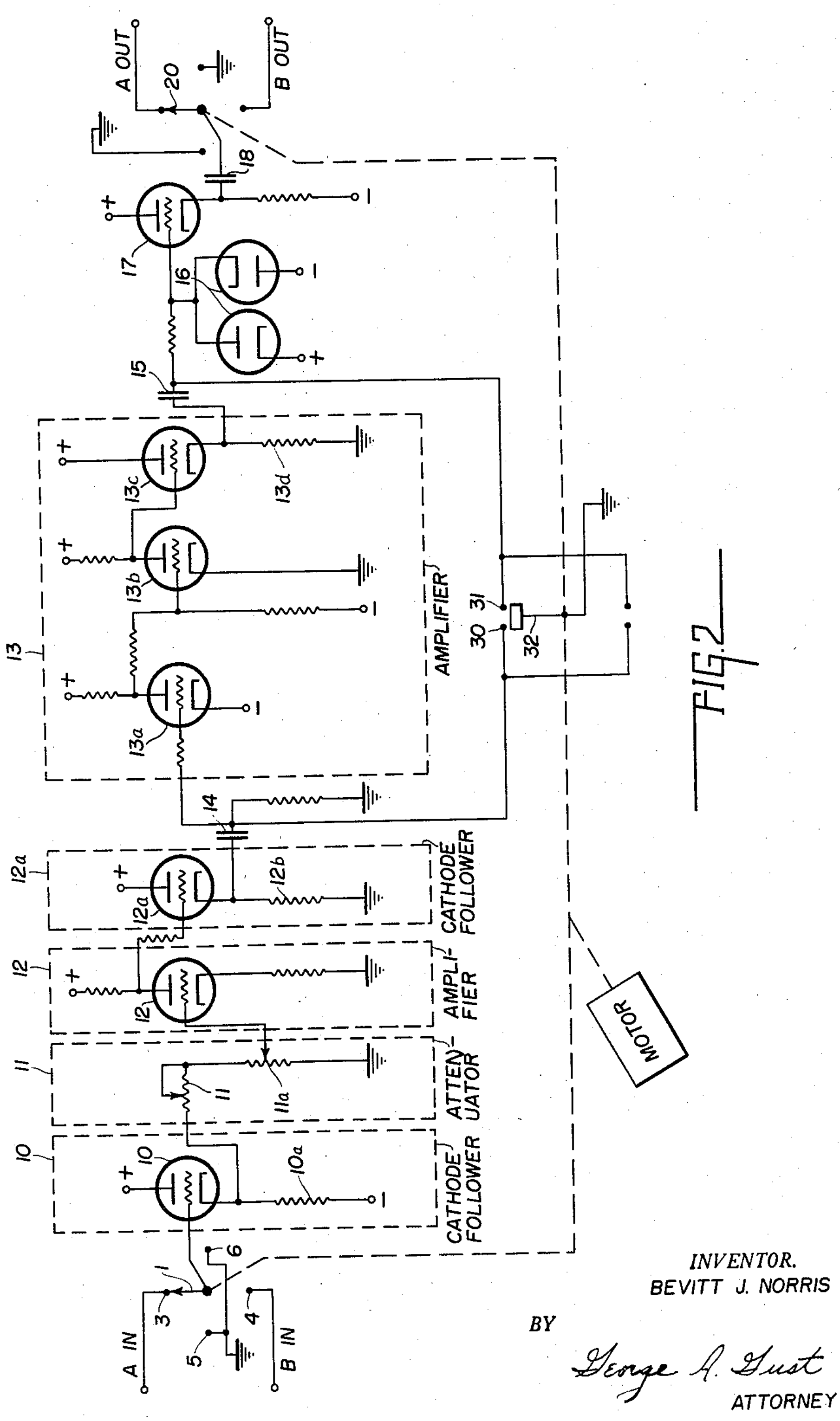
Fig. 2 is a detailed circuit diagram of the system of Fig. 1.

The system of Fig. 1 has been enlarged in Fig. 2 to show in greater detail the circuits of the improved multiplexing system of this invention. The wiper 1 is connected directly to the grid of the cathode follower 10, the cathode load resistor 10*a* being coupled preferably through the adjustable attenuator 11 and the coupling potentiometer 11*a* to the grid of the high gain amplifier 12, the anode circuit of which is coupled directly to the grid of the cathode follower 12. No coupling reactance is employed up to this point, it will be noted.

The signal across the cathode resistor 12*b* of the cathode follower is applied through coupling condenser 14 to the grid of the first tube of high gain amplifier 13. Increased gain is obtained in stages 13*a* and 13*b* with additional stages as desired and the signals are finally applied to the grid of the cathode follower stage 13*c*. The voltage across the cathode resistance 13*d* is applied through coupling condenser 15 to the clamping and limiting circuit 16. The limited signals are relayed through the cathode follower 17 to the wiper 20 and hence to the output circuits A and B.

It will be observed that the alternating current coupling points 14 and 15 are connected to contacts 30 and 31 which are grounded after the transmission of each signal. The low impedance path to condenser 14 through cathode follower 12 and the low impedance to condenser 15 through cathode follower 13*c* assures the return of these two condensers to a quiescent state during the short period of time contacts 30 and 31 are grounded. The number of the grounding contacts 30 and 31 are duplicated in accordance with the number of channels A, B, etc., to be transmitted so that coupling condensers 14 and 15 are grounded after each signal. It follows that a single high gain amplifier can be employed to amplify any desired number of the signals to be multiplexed without cross-talk.

While I have described above the principles of my invention in connection with specific apparatus, it is to be clearly understood that this description is made only by way of example and not as a limitation to the scope of my invention.

What is claimed is:

1. A multiplex system comprising an amplifier having an input condenser and an output condenser, a first multiplex switch operatively coupled to said input condenser, a second multiplex switch operatively coupled to said output condenser, and a grounding switch operatively coupled to both condensers for selectively connecting them to a reference potential, all of said switches being synchronously coupled together.

2. A multiplex system comprising an amplifier having an input condenser and an output condenser, a first multiplex switch operatively coupled to said input condenser, a second multiplex switch operatively coupled to said output condenser, a grounding switch operatively coupled to both condensers for selectively connecting them to a reference potential, and synchronizing means for operating all of said switches in synchronism.

3. A multiplex system comprising a multiplexing switch for sampling a plurality of signal sources, a cathode follower, said switch being coupled through said cathode follower to a coupling condenser, a high gain amplifier connected to said condenser, a second cathode follower connected to said amplifier, a second coupling condenser connected to said second cathode follower, and a second multiplexing switch coupled to said second condenser; and a synchronous grounding switch connected to each of said condensers, said grounding switch being synchronously coupled to said multiplexing switches.

4. A signal amplifying system comprising a high gain amplifier stage, a low-impedance coupling resistor, a coupling condenser connected between the amplifier stage and said resistor, a grounding switch directly connected between the amplifier side of the condenser and a point of ground potential, and means to cyclically open and close the switch.

5. A multiplex system comprising an amplifier having input and output circuits, a first condenser connected in series with the input circuit, a second condenser connected in series with the output circuit, grounding switch means operatively coupled between the amplifier side of both condensers and a source of reference potential, first multiplex switch means operatively coupled to said first condenser, second multiplex switch means operatively coupled to said second condenser, and synchronizing means for operating all of said switches in synchronism.

6. A multiplex system comprising an amplifier, at least two signal input circuits, a multiplex switch cooperating with said input circuits coupled to said amplifier by a condenser for sequentially connecting said input circuits to said amplifier, a grounding switch operatively coupled between the amplifier side of said condenser and a reference potential, means for operating both switches in synchronism, and utilization means operatively coupled to said amplifier.

7. In combination in a multiplexing system for transmitting separate signals, a high gain amplifier having input and output coupling condensers, two cathode followers coupled to said condensers respectively, multiplex switches operatively coupled to the cathode followers respectively, and a grounding switch synchronously coupled to said multiplex switches for grounding each condenser after each signal transmission.

References Cited in the file of this patent

UNITED STATES PATENTS

| | | |
|---|---|---|
| 2,546,338 | Glasford et al. | Mar. 27, 1951 |
| 2,706,265 | Buehler | Apr. 12, 1955 |
| 2,709,205 | Colls | May 24, 1955 |